UNITED STATES PATENT OFFICE.

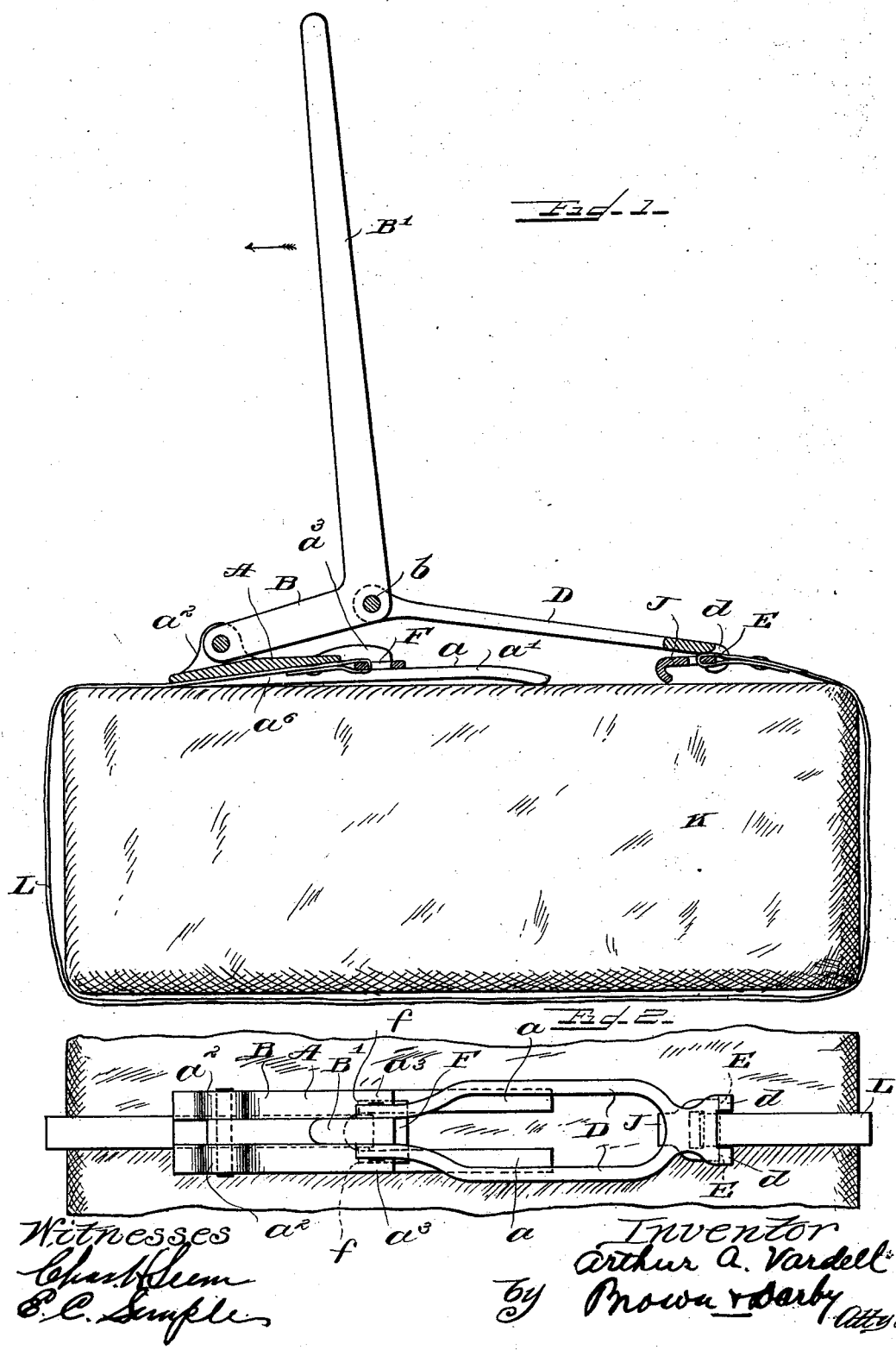

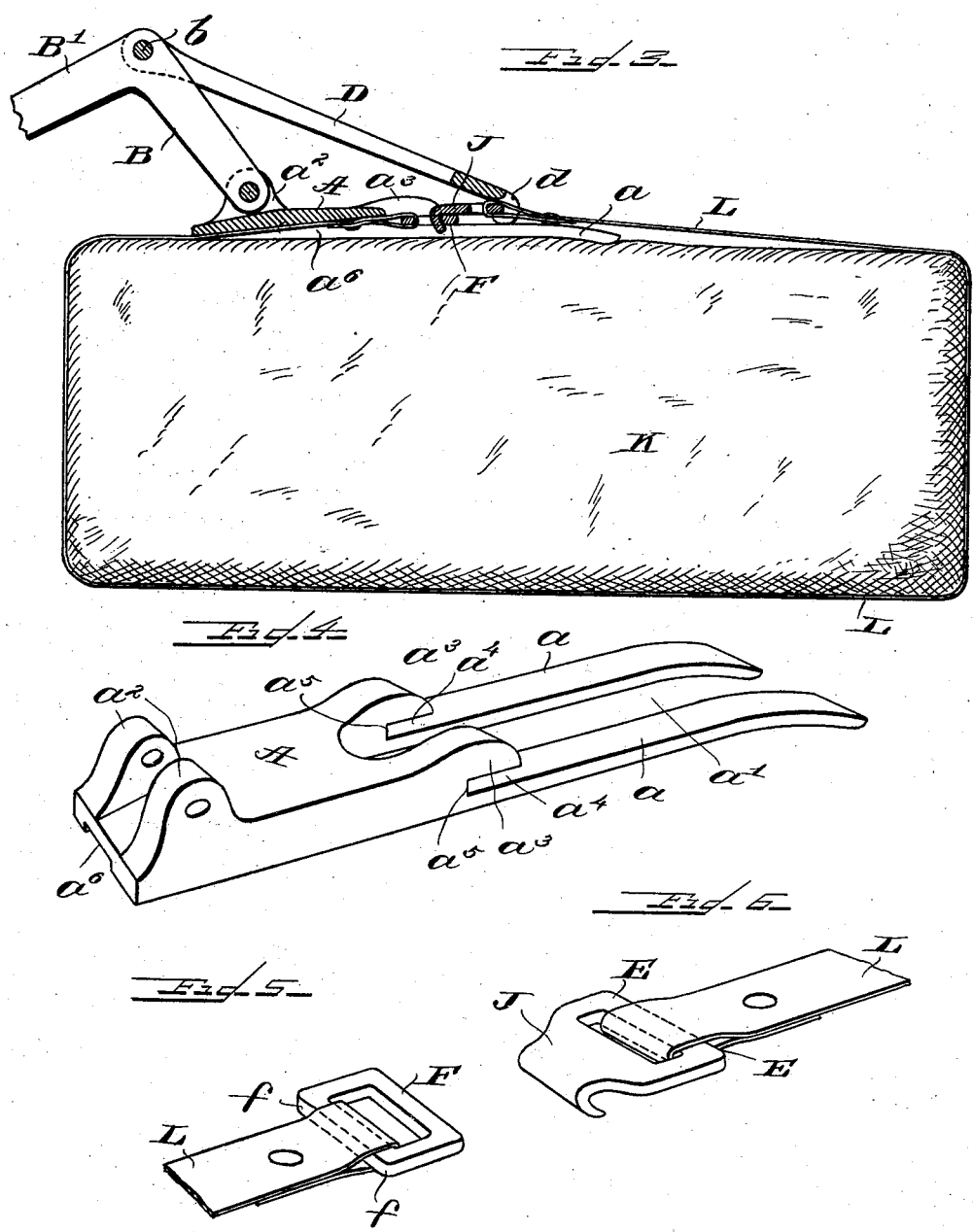

ARTHUR A. VARDELL, OF DALLAS, TEXAS.

BALE-BAND APPLYING AND TIGHTENING DEVICE.

SPECIFICATION forming part of Letters Patent No. 694,448, dated March 4, 1902.

Application filed January 14, 1901. Serial No. 43,107. (No model.)

*To all whom it may concern:*

Be it known that I, ARTHUR A. VARDELL, a citizen of the United States, residing at Dallas, in the county of Dallas and State of Texas, have invented a new and useful Bale-Band Applying and Tightening Device, of which the following is a specification.

This invention relates to bale-band applying and tightening devices.

The object of the invention is to provide an applying and tightening device for bale-bands which is simple in construction and efficient in operation.

The invention consists, substantially, in the construction, combination, location, and arrangement, all as will be more fully hereinafter set forth, as shown in the accompanying drawings, and finally pointed out in the appended claims.

Referring to the accompanying drawings, and to the various views and reference signs appearing thereon, Figure 1 is a view in vertical section of a band applying and tightening device embodying the principles of my invention and showing the same in position with relation to a bale and a bale-band to perform the function of applying and tightening the band upon the bale. Fig. 2 is a plan view of the same. Fig. 3 is a view similar to Fig. 1, showing the relative position of the parts after the band has been applied to the bale and tightened therearound. Fig. 4 is a detached detail view in perspective of the shoe. Fig. 5 is a broken detail view in perspective of the eyelet end of the bale-band. Fig. 6 is a similar view of the hook end of the bale-band.

In the application of bale-bands to bales or packages it is desirable to provide means whereby the bands may be applied rapidly and adjusted and tightened around the bale expeditiously. It is also desirable to provide a construction of band applying and tightening device whereby during the applying and tightening operations the bale is not warped or pulled to one side more than to the other. This is particularly true in the case of bale-bands applied as a permanent securing or holding device for bales of great density, and particularly bales of fibrous or other material, such as is shown, described, and claimed in Patent No. 661,475, issued November 6, 1900, to George A. Lowry.

It is the special purpose of the present invention to provide a bale-band applying and tightening device which while adapted for use generally in applying bale or securing bands to all kinds of bales or packages is particularly well adapted for use in applying and tightening the permanent bands or holding devices to bales of the character shown and described in said patent.

Referring to the accompanying drawings, reference-sign K designates a bale to which a bale band or strap L is to be applied. The bale-band L may be of the usual or any suitable or convenient material and construction; but in practice I prefer to employ a bale-band having an eyelet F in one end thereof and a hook J in the other end. As the bales, and particularly bales of the character disclosed in the patent above mentioned, are usually of uniform and predetermined dimensions, the bands may be of a certain and uniform length, so that each band applied to the bale or package can be drawn up or tightened uniformly, thus avoiding the objection of warping or pulling the bale to one side more than to the other.

Reference-sign A designates a shoe or block, to which may be pivotally connected the end B of an angle-lever. Pivotal connection of said lever and shoe may be effected in any suitable or convenient manner. In the particular form shown, to which, however, my invention is not limited, the shoe A is provided with ears $a^2$, forming means for pivotally attaching the angle-lever to the shoe. The shoe is provided with a forked or bifurcated end formed by the fingers $a$, the space $a'$ between such fingers or projections being of sufficient transverse dimension or width to receive and accommodate the bale-band therein. The shoe A is also provided with a grooved recess or seat $a^6$ in its under surface, which is or should be of suitable dimensions to receive the bale-band therein, as clearly shown in Figs. 1 and 3. The shoe is also provided with lugs or projections $a^3$, forming seats or recesses $a^4$, for a purpose presently to be more fully explained. Pivotally connected to the angle-lever at the angle thereof, as at $b$, is a yoke or link D, having the free end thereof forked and provided with hooks $d$, the space between the hooks $d$ being somewhat greater than the transverse width of the bale band or strap. The end B' of the angle-lever forms a handle or operating part by which said lever may be rocked.

In the operation of applying and tightening a band in accordance with the principles of my invention the band is passed around the bale or other package K and the shoe is placed over one of the ends—as, for instance, the eyelet end of the band—the band being received within the seat or recess $a^6$ in the shoe and the shoulders $f$ of the eyelet F being received within the recess $a^4$, formed by the projections $a^3$, and resting against the rear walls $a^5$ of such seats or recesses. The hook ends $d$ of link or yoke D are then straddled over the other end of the band or strap in engagement with the shoulders E of the hook J. The parts are now in the relative positions shown in Fig. 1. The handle end B' of the lever is then rocked or swung in the direction indicated by the arrow in said figure, which action causes the shoe and the hooked end of link or yoke D to approach each other, thereby tightening up on the band until finally the hook J is engaged in the eyelet F, (see Fig. 3,) and the work of application and tightening of the band is completed, and the relative position of the parts at the completion of this work is shown in Fig. 3. In order to detach the tightener, lever-handle B' is swung back in the opposite direction, thereby relieving the hooked end of link or yoke D from engagement with the hook J of the strap or band, and the shoe A may be readily slid or moved back or away from the eyelet F until the shoulders $f$ thereof are disengaged from the seats or recesses $a^4$. The shoe can then be removed and the bale band or strap remains efficiently applied to the bale.

From the construction above described it will be readily seen that I provide an exceedingly simple and efficient bale-band applying and tightening device with which the bale-band may be quickly applied, wherein a large amount of leverage is secured and by which the bale-bands are uniformly applied to the bales or packages.

Many variations and changes in the details of construction and arrangement would readily occur to persons skilled in the art and still fall within the spirit and scope of my invention. I do not desire, therefore, to be limited or restricted to the exact details shown and described; but, Having now set forth the object and nature of my invention and a construction embodying the principles thereof, what I claim as new and useful and of my own invention, and desire to secure by Letters Patent of the United States, is—

1. In a bale-band applying and tightening device, a shoe arranged to engage one end of the bale band or strap, a lever pivotally connected to said shoe, a link or yoke pivotally connected to said lever and arranged to engage the other end of the band or strap, whereby when said lever is rocked the ends of the band or strap are drawn together, as and for the purpose set forth.

2. In a bale-band applying and tightening device, a shoe provided with a shoulder arranged to engage behind the eyelet in one end of the band or strap, a lever pivotally connected to said shoe, a yoke or link pivotally connected to said lever and provided with a hooked end arranged to engage behind the hook in the other end of the bale band or strap, whereby when said lever is rocked said hook and eyelet are drawn toward each other for engagement, as and for the purpose set forth.

3. In a bale-band applying and tightening device, a shoe having a forked end, shoulders formed in the forks thereof, a lever pivotally connected to said shoe, a link or yoke pivotally connected to said lever and provided with a forked and hooked end, as and for the purpose set forth.

4. In a bale-band applying and tightening device, a shoe provided with forked projections arranged to form seats or recesses, a lever pivotally connected to said shoe, a yoke or link pivotally connected to said lever and provided with a hooked end, as and for the purpose set forth.

5. In a bale-band applying and tightening device, a shoe provided on the under surface with a longitudinal seat or depression adapted to receive the bale band or strap therein, and at its front end provided with a shoulder arranged to engage behind the edges of the eyelet in one end of the bale band or strap, a lever pivotally connected to said shoe, and a hooked link or yoke arranged to engage the hook end of the bale band or strap, said link or yoke being pivotally connected to said lever, as and for the purpose set forth.

6. In a bale-band applying and tightening device, a shoe provided with a shoulder arranged to engage one of the holding parts of the band carried in one end thereof, an angle-lever pivotally connected at one end to said shoe, a link or yoke pivotally connected to said lever at the angle thereof and provided with a hook at its other end, said hook arranged to engage the coöperating engaging part carried in the other end of the bale-band, as and for the purpose set forth.

7. In a bale-band applying and tightening device, a shoe provided with a longitudinal seat or recess in the under surface thereof and formed with suitably-spaced fingers or projections at its front end, said shoe provided with suitably-spaced projections arranged to form a seat or shoulder, in combination with an angle-lever pivotally connected to said shoe, a link or yoke pivotally connected to said lever at the angle thereof, and having a forked end formed with hooks, as and for the purpose set forth.

In witness whereof I have hereunto set my hand, this 2d day of January, 1901, in the presence of the subscribing witnesses.

ARTHUR A. VARDELL.

Witnesses:
B. R. PREUSS,
M. WILLCHECK.